Dec. 22, 1964  R. A. KNUDSON ETAL  3,162,427
MEANS FOR CLEANING DAIRY BARN VACUUM LINES
Filed Dec. 7, 1961

INVENTORS.
Russell A. Knudson
Ned D. Bailey
BY Fred C. Matheny
ATTORNEY.

United States Patent Office

3,162,427
Patented Dec. 22, 1964

3,162,427
MEANS FOR CLEANING DAIRY BARN
VACUUM LINES
Russell A. Knudson, 616 NW. 116th St., and Ned D.
Bailey, 822 NW. 116th St., both of Seattle, Wash.
Filed Dec. 7, 1961, Ser. No. 157,787
5 Claims. (Cl. 259—4)

Our invention relates to means for cleaning dairy barn vacuum lines.

Dairy or milk barns in which milking machines are used are equipped with suction conduits, commonly called vacuum lines. These vacuum lines are pipes connected with a vacuum tank and extending around the barn in such a way as to make them readily accessible from the several stalls where the milking machines are used. Valves, commonly termed stall cocks, are provided in the vacuum line, usually one near each stall so that a milking machine can be conveniently connected by a flexible conduit, commonly termed a stanchion hose, with the vacuum line at the location of each stall to provide the correct vacuum for proper operation of the milking machine.

It is highly desirable that these vacuum lines be kept clean and unobstructed both for sanitary reasons and to insure proper operation of the milking machines. These vacuum lines require frequent cleaning because they tend to collect all kinds of air borne dust, small particles of solid matter, insects and the like and because it has been found to be impossible, under ordinary conditions of use, to prevent some milk from being drawn into these vacuum lines at times. The milk and solid matter which gets into these vacuum lines renders them unsanitary by making them a breeding place for bacteria and it reduces their vacuum exerting capacity by obstructing them. Bacteria laden vacuum lines inevitably increase the bacteria count of milk taken by machines which are operated from those lines. Reduction of the vacuum capacity of these lines can be harmful to the cows milked by milking machines operated from these lines.

It has heretofore been difficult and troublesome to clean these vacuum lines. Also, because the contamination and obstruction of these lines is not visible from the exterior and because their cleaning requires the use of caustic cleaning material, which can be injurious to the user, there has been a strong tendency for the user to neglect to clean them.

Objects of our invention are to provide improved means for cleaning these vacuum lines, and in so doing to reduce the amount of time and labor required to clean them, make possible more efficient cleaning of these lines and minimize the danger of injury to the person doing the cleaning. Reducing the time and labor and danger incident to cleaning these vacuum lines lessens the possibility that the user will neglect to clean them, and this in the long run, tends to improve the sanitary characteristics of the milk coming from dairies using the lines.

Another object is to provide improved applicator means by which hot water mixed with air and caustic cleaning material can be safely and efficiently used in cleaning vacuum lines.

Other objects of our invention will be apparent from the following description and accompanying drawings.

In the drawings FIGURE 1 is a view in elevation of a vacuum line cleaning applicator constructed in accordance with our invention.

Like reference numerals refer to like parts throughout the several views.

Figure 1:
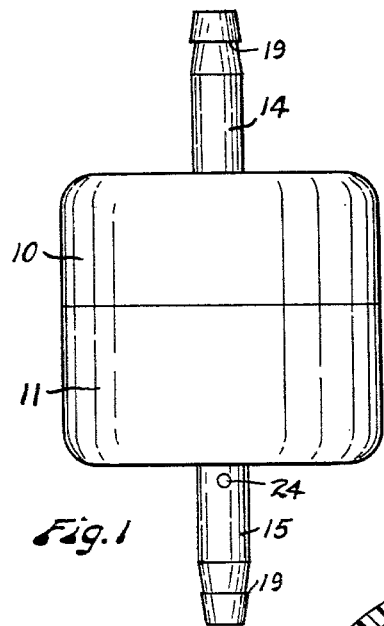
Figure 2:
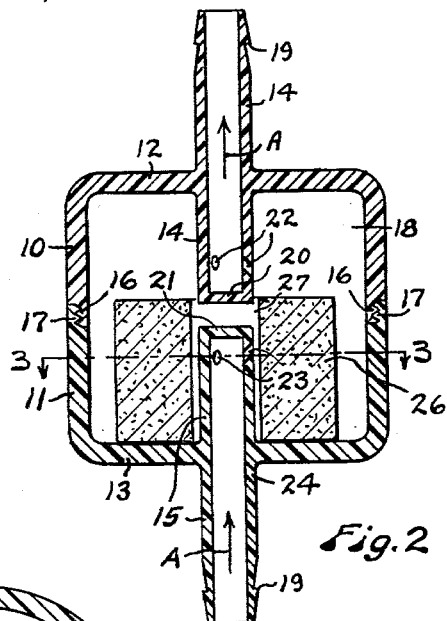
FIG. 2 is a view in longitudinal mid section of the same showing a cake of cleaning material in the applicator.
Figure 3:
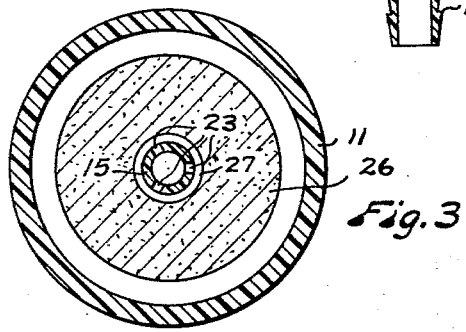
FIG. 3 is a cross sectional view taken substantially on broken line 3—3 of FIG. 2.

A preferred example of our vacuum line cleaning apparatus is shown by way of illustration in the drawings but it will be understood that the form of this apparatus can be varied. The drawings show an applicator formed of two cup shaped cylindrical members 10 and 11 of approximately equal size. Because the member 10 is uppermost when in use it is herein termed an upper cup shaped member and the other member 11 is termed a lower cup shaped member. The cup shaped member 10 has an upper end wall 12 and the cup shaped member 11 has a lower end wall 13. The other ends of both cup shaped members are open. The end walls 12 and 13 of the cup shaped members 10 and 11 are respectively provided with axial tubes 14 and 15.

The lower end portion of the upper cup shaped member 10 is externally shouldered and provided with a thread 16. The upper end portion of the cup shaped member 11 is internally shouldered and provided with an internal thread 17. The two threads 16 and 17 are complemental and the two cup shaped members can be threaded together to form therein a mixing chamber 18. Preferably the threaded parts 16 and 17 of the two cup members 10 and 11 are short in length and the threads thereon are fairly steep so that the two members 10 and 11 can be quickly and easily engaged and disengaged relative to each other without a great deal of relative turning movement.

Each axial tube 14 and 15 extends a substantial distance outwardly from the end wall with which it is united and terminates in an open end. The outermost terminal portion of each tube 14 and 15 is preferably externally tapered and provided with at least one annular shoulder 19 so that a hose can be easily fitted thereover and will be firmly retained thereon.

The tubes 14 and 15 extend a substantial distance inwardly from the respective end walls 12 and 13 with which they are united and terminate respectively in closed ends 20 and 21. The closed tube ends 20 and 21 are positioned near each other and about medially of the length of the mixing chamber 18 when the two cup shaped members are threaded together. The inner end portion of the tube 14 is provided, near the closed end 16 thereof, with a plurality of liquid flow perforations 22 and the inner end portion of the tube 15 is similarly provided with a plurality of perforations 23. Preferably the perforations 22 and 23 in the respective tubes 14 and 15 are inclined from inner to outer end toward the adjacent end wall 20 or 21 of the tube.

An inclined air inlet perforation 24 is provided in the lowermost tube 15 below but close to the bottom 13 of the lower cup shaped member 11. The perforation 24 is inclined preferably at an angle in the order of forty-five degrees in a direction which, from outer to inner end of the perforation, is toward the plane of the bottom member 13. Liquid flowing in the direction of arrows A in the tube 15 will draw in air through the perforation 24 and this air will mix with and agitate the water thereby increasing the cleaning efficiency of the water, which will have a scrubbing action in the pipes. This also makes possible a saving in the amount of hot water used. A short piece of flexible hose 25 is connected with the lowermost end portion of the lower tube 15.

The mixing chamber 18 formed by the two housing parts 10 and 11 is adapted to received a doughnut shaped cake 26 of a preferably caustic cleaning material. Because this caustic material is in cake form it is less dangerous to handle than it would be if in powdered or granulated or like form. A cake 26 composed of ninety percent sodium ortho silicate, eight percent chlorine, and two percent trisodium phosphate is satisfactory but obviously the composition of this cake of caustic detergent material can be varied. The cake 26 is made in cylindrical form of smaller external diameter and shorter length than the interior of the chamber 18 and said cake has in it an axial passageway 27 of a diameter larger than the external diameter of the liquid conduit tubes 14 and 15. The passageway 27 fits over the tubes 14 and 15 when the cake is in the mixing chamber 18. The cake 26 will move up and down in the chamber 18 when water is passing upwardly through the applicator and the water will wash all around the cake and will dissolve the cake evenly and uniformly. This insures that the water will always carry a correct amount of dissolved caustic detergent material for efficient cleaning of the vacuum line. The angle or incline of the liquid flow perforations 22 and 23 in tubes 14 and 15 helps in causing the water to follow a circuitous path in the mixing chamber 18. These perforations 22 and 23, being in the sides rather than in the ends of the tubes 14 and 15 prevent the water from passing directly from tube 15 to tube 14 without washing over and around the cake 26.

Figure 4:
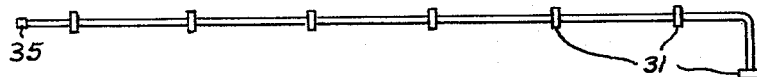
FIG. 4 is a somewhat schematic view illustrating a method of using our applicator in cleaning a vacuum line.
Figure 4:
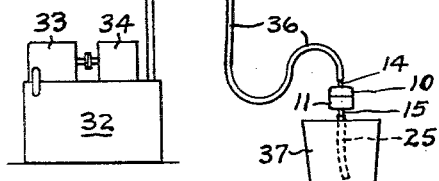

Our method of cleaning a vacuum line together with the apparatus used is schematically shown in FIG. 4. In said FIG. 4 the numeral 30 indicates a vacuum line. Ordinarily these vacuum lines are installed in dairy or milk barns in such a manner that they can be used to service any of the stalls in which cows are milked. Valves 31, ordinarily termed stall cocks, are provided in the vacuum line 30. Usually one valve 31 is provided at or near the location of each stall. One end of the vacuum line 30 is connected with vacuum exerting means, such as a vacuum tank 32 in which vacuum is maintained by a vacuum pump 33 driven by a motor 34. The other end of the vacuum line 30 is closed, for instance by a cap 35. A conventional milking machine, not herein shown, can be connected by a suitable vacuum hose with any convenient one of the stall cocks 31 to provide vacuum for operating the milking machine. As previously explained these vacuum lines 30 become contaminated and obstructed by having milk, dust, particles of solid matter, insects and the like drawn into them and they require frequent cleaning. In accordance with our invention we can quickly and easily and efficiently clean a vacuum line and the stall cocks and hoses connected therewith by using our applicator in the following manner.

A supply of hot water is provided in a receptacle 37, a cake 26 of cleaning material is placed in the applicator, the uppermost tube 14 of said applicator is connected with the lower end of a stanchion hose 36; the upper end of the stanchion hose 36 is connected with the stall cock 31 closest to the vacuum tank 32; and the motor 34 is started so as to provide vacuum in the tank 32. The lowermost hose 25 of the applicator is then dipped into the hot water in the receptacle 37 for a period of about ten seconds. This causes hot water mixed with air and carrying dissolved cleaning material to be drawn through the applicator and through the hose 36, stall cock 31, and a section of the vacuum line 30 into the vacuum tank 32. After the washing has continued for about ten seconds the lower hose 25 is lifted out of the hot water in the receptacle 37. The hose 36, or another stanchion hose which it is desired to clean, is then connected between the second stall cock 31 and the upper tube 14 of the applicator and the cleaning process is repeated. The hot water, in passing to and through the applicator, draws in air through the air inlet opening 24 and dissolves cleaning material from the cake 26. The air thus drawn into the water helps in causing the water to foam and in this way increases the scouring action of the water in the conduits. Because of this increased scouring action resulting from the intake of the air the water cleans the conduits more efficiently and with the use of less hot water than would be possible if no air was mixed with the water.

Preferably the receptacle 37 is large enough so that it will hold sufficient hot water to wash out several sections of the vacuum line 30. More hot water is obtained when needed and the vacuum tank 32 is emptied as required. The cleaning of successive sections of the vacuum line proceeds until the entire line has been cleaned. The cleaning solution from each successive section of the vacuum line washes through all of the previously cleaned sections thus subjecting them to further cleaning.

After cleaning the last section of the vacuum line use of the applicator is discontinued, or the cake 26 is removed therefrom and the entire vacuum line is preferably rinsed out with warm clear water. All stall cocks 31 are included in the cleaning process, and by suitably changing stanchion hoses 36 between successive cleaning operations, all of these hoses can be cleaned.

The foregoing description and accompanying drawings clearly disclose a preferred method of and means for carrying out our invention but it will be understood that this disclosure is merely illustrative and that changes may be made within the scope of the following claims.

We claim:

1. In apparatus for cleaning a vacuum line used in connection with a milking machine, an applicator housing formed of at least two readily detachable parts capable of cooperating in providing a mixing chamber; and two aligned liquid conduit tubes rigid with two relatively detachable parts of said housing respectively, the outer end portions of said tubes extending outwardly from the respective housing parts by which they are carried, the inner end portions of said tubes extending inwardly from the respective housing parts by which they are carried, the inner ends of said tubes being closed and being positioned close together within the mixing chamber when the housing parts are in assembled relation, the inwardly extending portions of said tubes having perforations in the side walls thereof, one of the liquid conduit tubes being a water inlet tube and having an air inlet passageway provided in the wall of the outwardly extending portion thereof outwardly from but adjacent to the wall of the housing part by which it is carried, said air inlet passageway being inclined relative to the water inlet tube so that its inner end is closer than its outer end to the wall of the housing part by which it is carried.

2. In apparatus for cleaning a vacuum line used in connection with a milking machine, two cup shaped members; means capable of detachably securing said two cup shaped members together with their open ends in registration in forming a mixing chamber in said two cup shaped members; and two aligned liquid conduit tubes rigid with the respective cup shaped members, the outer end portions of said tubes extending outwardly from said cup shaped members, the inner end portions of said tubes extending into said cup shaped members and the inner ends of said tubes being closed and being positioned close together within said mixing chamber when said cup shaped members are in assembled relation, the inwardly extending portions of said tubes having perforations in the side walls thereof.

3. The apparatus as claimed in claim 2 in which a cake of water soluble cleaning material having a longitudinal passageway extending through it is disposed within the mixing chamber formed by the two cup shaped members, the passageway in the cake fitting loosely over the inwardly extending end portions of the two liquid conduit tubes.

4. The apparatus as claimed in claim 2 in which one of the liquid conduit tubes is a water inlet tube, and in which an air inlet passageway is provided in the wall of the outwardly extending portion of said water inlet tube adjacent to the cup shaped member to which the tube is secured, said air inlet passageway being inclined relative to said water inlet tube toward the adjacent cup member from its outer toward its inner end.

5. In apparatus for cleaning a vacuum line used in connection with a milking machine, two cup shaped cylindrical members each having an open end and a closed end; complementary threads on said cup shaped members adjacent their open ends capable of detachably securing said two cup members together in forming a mixing chamber therein; a liquid inlet conduit tube rigid with the end wall of one of said cup shaped members and extending both outwardly and inwardly from said end wall; an air intake passageway in the side wall of the outwardly extending portion of said liquid inlet tube close to and outwardly from the end wall with which the tube is connected, said air intake passageway, considered from outer to inner end thereof, being inclined relative to said liquid inlet tube at a substantial angle toward the adjacent end wall, whereby air will be drawn through said air intake passageway into water entering the mixing chamber through the liquid inlet tube; a liquid outlet conduit tube connected with the end wall of the other cup shaped member and extending both outwardly and inwardly from said end wall, said two tubes being aligned with each other and the inner ends of both of said tubes being closed and being positioned close together within said mixing chamber when the two cup shaped members are in assembled relation; and perforations in the side walls of the inwardly extending portions of said two tubes adjacent the closed ends thereof, at least some of the perforations in the inwardly extending portion of said liquid inlet tube being inclined relative to said tube from their inner toward their outer ends toward the adjacent closed end of the tube.

References Cited in the file of this patent

UNITED STATES PATENTS

| | | |
|---|---|---|
| 829,367 | Chandler | Aug. 21, 1906 |
| 1,194,542 | Raymond | Aug. 15, 1916 |
| 1,315,831 | Halbert | Sept. 9, 1919 |
| 1,763,374 | Schrader | June 10, 1930 |
| 1,887,985 | Auker | Nov. 15, 1932 |
| 1,925,971 | Simon | Sept. 5, 1933 |
| 2,014,037 | Burkett | Sept. 10, 1935 |
| 2,556,128 | Webb | June 5, 1951 |
| 2,726,667 | Wigmore | Dec. 13, 1955 |
| 2,777,467 | Powell | Jan. 15, 1957 |
| 2,818,076 | Erling | Dec. 31, 1957 |
| 2,919,704 | Butler | Jan. 5, 1960 |